United States Patent [19]

Chae et al.

[11] Patent Number: 5,222,004
[45] Date of Patent: Jun. 22, 1993

[54] SLANT POST DRIVING DEVICE FOR A VIDEO CASSETTE RECORDER

[75] Inventor: Yoo Seok Chae, Kyungki, Jong Hoon Kim, Seoul, both of Rep. of Korea

[73] Assignee: Goldstar Co., Ltd., Seoul, Rep. of Korea

[21] Appl. No.: 775,557

[22] Filed: Oct. 15, 1991

[51] Int. Cl.⁵ .............................................. G11B 5/027
[52] U.S. Cl. .......................................... 360/85; 360/95
[58] Field of Search .................................... 360/85, 95

[56] References Cited

U.S. PATENT DOCUMENTS

| | | | |
|---|---|---|---|
| 4,757,397 | 7/1988 | Zaitsu et al. | 360/85 |
| 4,930,720 | 6/1990 | Hwang | 242/198 |
| 4,933,787 | 6/1990 | Chung | 360/85 |
| 4,984,105 | 1/1991 | Hwang | 360/85 |
| 5,099,370 | 3/1992 | Kim | 360/85 |

*Primary Examiner*—David C. Nelms
*Assistant Examiner*—T. Davenport
*Attorney, Agent, or Firm*—Birch, Stewart, Kolasch & Birch

[57] ABSTRACT

A slant post driving device for a video cassette includes a slide member provided integrally to a take-up reel side loading ring and to which slant bases for a guide roller and a slant post, guiding means having an Y-shaped guide slot for guiding both the slant bases, and a guide piece disposed at a branched position of the guide slot to separate the travel of the slant bases being guided by the guide slot, whereby both the slant bases for the guide roller and the slant post are simultaneously moved along the single guide slot comprising a guide slot portion for the guide roller and a branched guide slot portion for the slant post so that it is simple in construction, thereby providing compaction of the product and enhancing accuracy of operation.

4 Claims, 3 Drawing Sheets

SLANT POST DRIVING DEVICE FOR A VIDEO CASSETTE RECORDER

BACKGROUND OF THE INVENTION

1. Field of the Invention

The present invention relates to a slant post driving device for video cassette recorder and more particularly, to an improved slant post driving device for use in a video cassette recorder (hereinafter "VCR"), which is simple in construction, thereby providing compaction of a deck and enhancing accuracy of operation.

2. Description of the Prior Art

Various types of loading mechanisms for a video cassette recorder are well known in the field. One of such prior art loading device comprises, as shown in FIG. 1 of the accompanying drawings, a loading motor 1, a worm gear 2, connection gears 3 and 4, and loading gears 5 and 6 for carrying out power transmission. Such prior art loading device further comprises slant bases 8 and 10 having a guide roller 7 and a slant post 9, respectively and are coupled to the take-up reel side loading gear 6, and another slant base 11 is coupled to the supply reel side loading gear 5.

With this construction, during the forward and reverse rotations of the loading motor 1, the power transmission is effected the supply reel side loading gear 5 and the take-up reel side loading gear 6 through a gear train containing the worm gear 2, connecting gears 3 and 4. At this time, the respective slant bases 8, 10 and 11 connected to cam gears (not shown) are moved along guide slots 13, 14 and 12, respectively, for guiding the movement of the slant bases between their unloading positions as indicated by the two-dot-and-dash lines and their loading positions as indicated by the solid line so that a tape 14 is engaged with disengaged from a drum 15.

During the tape loading operation, in order to move the slant post 9 serving to change over the travelling state of the tape passed over a drum 15 at a predetermined angle, thereby permitting the tape to be smoothly wound on a take-up reel of a tape cassette in a vertical posture, when the driving force from the driving motor is transmitted to a cam gear 21 through either a separate gear train or a connection gear 20 engaged with the take-up reel side loading gear 6 shown in FIG. 1, such prior art device is arranged to rotate the cam gear 21 in a clockwise direction as shown in FIG. 2 and a lever cam 22 provided at one end with a pin 23 received in and slidingly movable along a curved slot 21a formed in the cam gear 21 is rotated about its center shaft in a counterclockwise direction. Thus a gear 25 engaged with a lower sector gear 22a formed integrally with the other end of the lever cam 22 is rotated in clockwise direction, whereby a post arm 24 having at its leading end the slant post 9 and connected to the gear 25 is turned from a position as indicted by the two-dot-and-dash lines to a position as indicated by the solid line so that the slant post 9 is moved along the guide slot 14 to a position for guiding the travel of the loaded tape.

However, such prior art device has a drawback wherein since the respective slant bases are arranged to be moved along the separately formed guide slot, the planer space arrangement is restricted so that it is difficult to realize compaction of the product. Furthermore, such prior art device is disadvantageous in which assembly work is not easy due to the complicated construction and power transmission course of the drive mechanism for the movement of the slant post. In addition, such prior art device requires exact timed relation and spring tension for the driving operation of the slant post, whereby an operating error may occur frequently.

SUMMARY OF THE INVENTION

Accordingly, it is an object of the present invention to provide a slant post driving device for a video cassette recorder, which is arranged to move unitedly a guide roller and a slant post by using a take-up reel side loading ring, while guiding the movement of the roller and the post by a single guide slot of a Y-shape during tape loading and unloading operations, and which eliminates the above problems encountered in conventional slant post driving device.

Another object of the present invention is to provide a slant post driving apparatus for a video cassette recorder, comprises a loading ring located in the vicinity of a take-up reel and rotatable with actuation of a driving motor, a slide assembly provided integrally to the loading ring and having a plurality of slots each receiving therein a guide pin and compression and tension springs, and slant bases for a guide roller and a slant post coupled thereto by links, guiding means comprising a guide slot of a general Y-shape and guiding the slant bases during tape loading and unloading operations, and a guiding piece disposed at a branched position of the Y-shaped guide slot to separate the travel of the slant bases being moved along the guide slot with the rotation of the loading ring.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
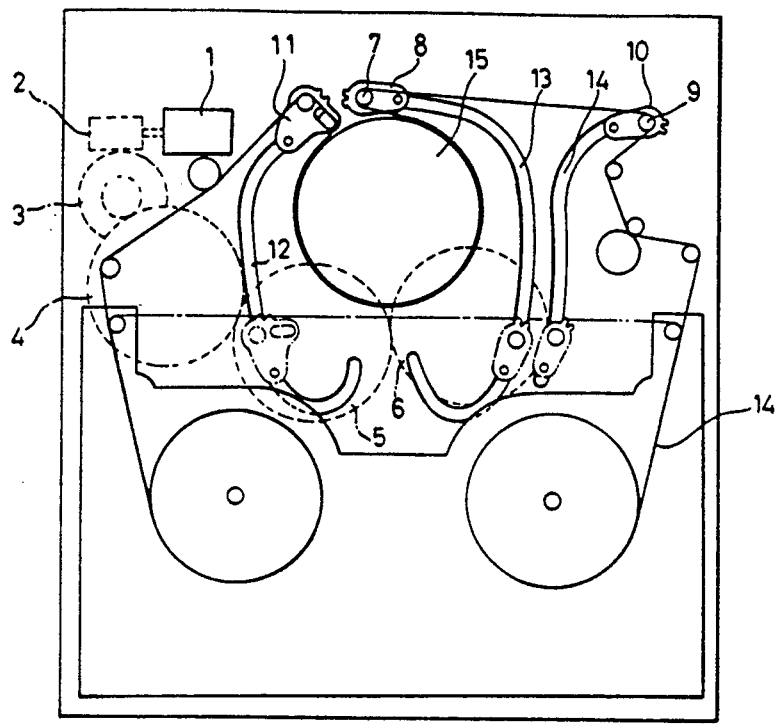
FIG. 1 is a schematic view of a conventional loading apparatus for a video cassette recorder including a slant post driving device.
Figure 2:
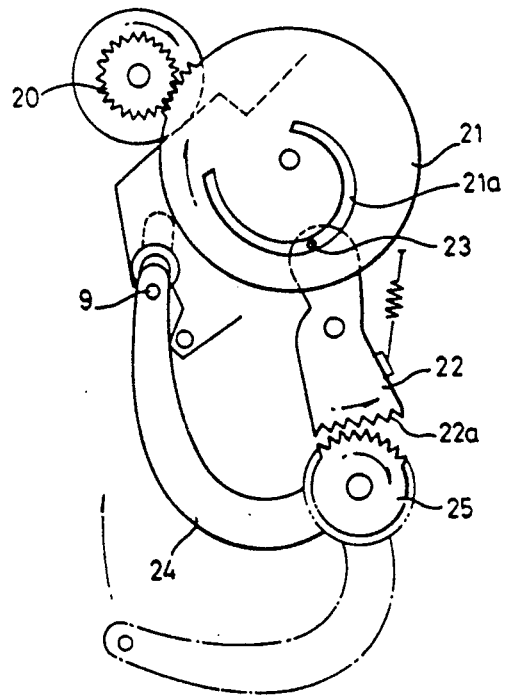
FIG. 2 is a view of showing the operation of the conventional slant post driving device.
Figure 3:
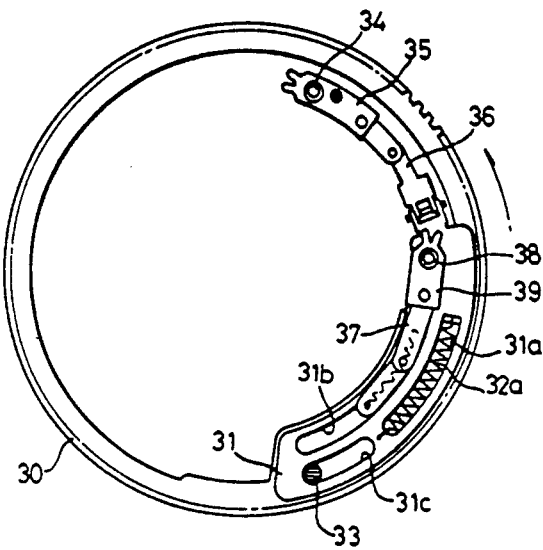
FIG. 3 is a plan view of the slant post driving device according to the present invention showing before the loading operation thereof.
Figure 4:
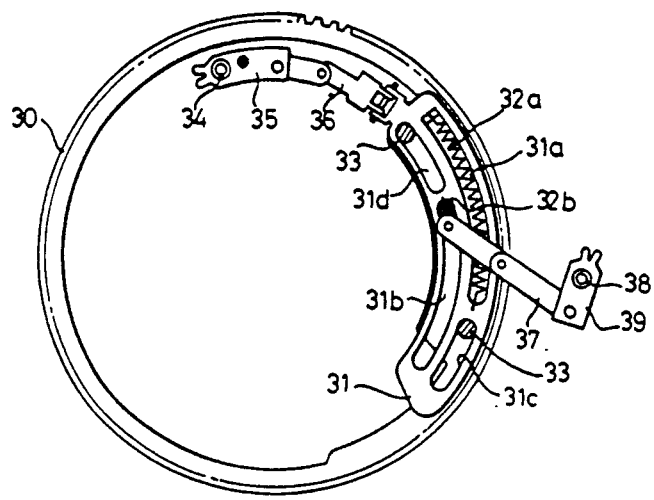
FIG. 4 is a view of the slant post driving device according to the present invention after the completion of the loading operation.

Referring now in detail to the drawings for the purpose of illustrating preferred embodiments of the present invention, the slant driving post device as shown in FIGS. 3 and 4, comprises a rotatable loading ring 30 located in the vicinity of a take-up reel and rotated in clockwise and counter-clockwise directions with rotation of a driving motor (not shown) for carrying out tape loading and unloading operations, and a slide member 31 either formed integrally with or separately formed and then assembled to the loading ring 30 and rotated along with the loading ring during rotation of the loading ring.

The slide member 31 is formed with outer and inner long slots 31a and 31b, and outer and inner short slots 31c and 31d. The inner long and the inner short slots 31b and 31d are positioned in staggered and opposite relationship to the outer long and outer short slots 31a and 31c as shown in FIGS. 3 and 4.

A slant base 35 having a take-up reel side guide roller 34 mounted thereon is connected to a leading end of the slide member 31 through a link 36, and a slant base 39 having a slant post 38 is disposed in one of the long slots such as the inner long short 31b of the slide member 31 via a slidable and articulately movable multi-articulation link 37.

Figure 5:
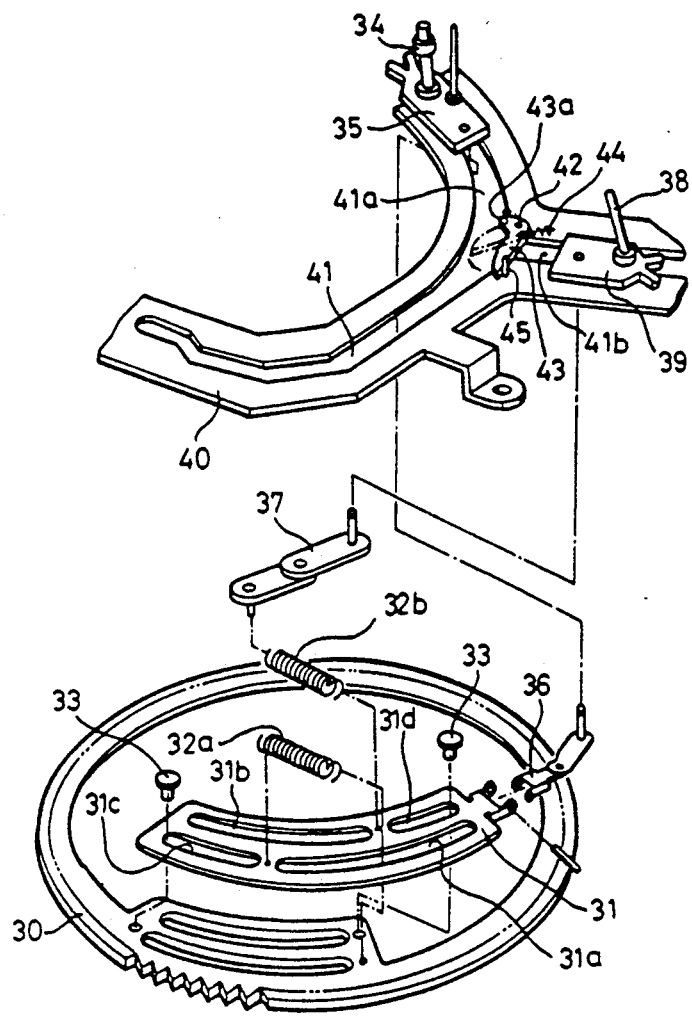
FIG. 5 is an exploded perspective view showing the essential components of the present invention.

Also, compression and tension springs 32a and 32b are disposed in the outer and inner long slots 31a and 31b of the slide member 31, respectively. Guide pins 33 fixed to the loading ring and caulked to the slide member 31 are inserted one into each of the short slots 31c and 31d to guide the movement of the slide member 31. More particularly, the compression spring 32a in one of the long slots such as the outer long slot 31a is disposed to extend between the loading ring 30 and the slide member 31 and the tension spring 32b in the other of the long slots such as the inner long slot 31b is disposed to extend between the slide assembly 31 and a connecting pin of the multi-articulation link 37. On the top of the loading ring 30, a loading base 40 as shown in FIG. 5 has a guide slot 41 for guiding both the slant bases 35 and 30. The guide slot 41 has an Y-shaped configuration including a primary guide slot portion 41a for initially guiding both the slant base 35 for the guide roller 34 and the slant base 39 for the slant post 38 in a given range and then guiding only the slant base 39 for the slant post 38 in a given range and then guiding only the slant base 35, and a secondary guide slot portion 41b branched from the primary guide slot portion 41a to guide the travel of only the slant base 39 for the slant post 38.

A guide piece 43 is pivotable about a pivot pin 42 and disposed at the branched position between the primary guide slot portion 41a and the secondary guide slot portion 41b, thereby selectively opening and closing the paths of the guide slot portions 41a and 41b depending upon the pivoted position thereof, respectively. The guide 43 having a cam-shaped configuration and an engaging portion 43a disposed on one side thereof. The loading base 40 is further provided with a spring 44 for imparting biasing force to the guide piece 43 to keep it at its original position, and a stopper rod 45 for determining a stopped position of the guide piece which is returned to the original position by the biasing force of the spring 44.

The slant bases 35 and 39 for the guide roller 34 and the slant post are guided along the Y-shaped guide slot 41 during the movement to their loading positions according to the construction of the present invention will be described below.

When the tape loading operation is initiated from a stop mode state of the video cassette recorder, the loading ring 30 with the slide member 31 mounted thereto is rotated in a counter-clockwise direction indicated by arrow from a position as shown in FIG. 3 to a position shown in FIG. 4 and thus the slant bases 35 and 39 for the guide roller 34 and the slant post 38 are coupled to the slide assembly start to be moved along the guide slot 41. This condition is an initial state indicated by the two-dot-and-dash lines in FIG. 5.

Figure 6A:
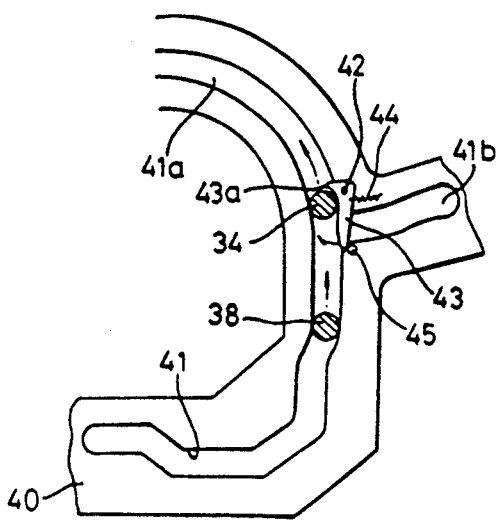
FIGS. 6A and 6B are explanatory views showing the operating process of the slant post driving device of the present invention.
Figure 6B:
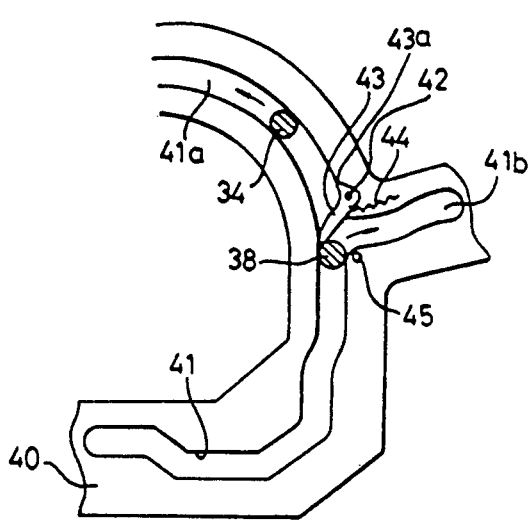

With the further rotation of the loading ring 30 as shown in FIG. 6A, the slant base 35 for the guide roller 34 which is moved in advance of the slant base 39 for the slant post along the primary guide slot portion 41a abuts against the pushes the engaging portion 43a of the guide piece 43 so that the guide piece is pivoted about the pivot pin 42 in a clockwise direction to close the primary guide slot portion 41a and open the secondary guide slot portion 41b. Subsequently, the slant base 39 for the slant post which flows the slant base 35 for the guide roller 34 is guided toward the secondary guide slot portion 41b by the guide piece 43 for pivotally closing the primary guide slot portion 41a as shown in FIG. 6B.

At this time, the distance between the slant bases 35 and 39 must be properly adjusted in which the guide piece 43 pivotally remains against the biasing force of the spring 44 by the slant base 35 for the guide roller 34 which pushes the engaging portion 43a to open the secondary guide slot portion 41b, and the slant base 39 for the slant post 38 which follows the slant base 35 may be smoothly moved into the open secondary guide slot portion. Because the slant base 39 for the slant post must be entered into the open secondary guide slot portion 41b before the slant base 35 for the guide roller departs from the engaging portion 43a of the guide piece 43, for example, before the pivoted guide piece 43 closes again the secondary guide slot portion 41b by the restoring force of the spring 44.

Thereafter, upon completion of the rotation of the loading ring 30 to the tape loading position, the slant bases 35 and 39 are held at their stopped positions indicated by the solid line as shown in FIG. 5 by means of stoppers (not shown) to enable the guide roller and the slant post to guide the loaded tape.

The slant bases 35 and 39 are stopped by the stoppers when the loading ring 30 slightly further rotates due to inertia force of the driving motor and the slide member 31 with the slant bases 35 and 39 coupled thereto assumes a condition in which it seems as if the slide member 31 is relatively rotated in a clockwise direction under the guidance by the guide pins 33 engaged with the short slots 31c and 31d during tensioning the compression spring 32a disposed between the loading ring 30 and the slide member 31 and at the same time compressing the tension spring 32b disposed between the slide assembly and the connecting pin of the multiarticulation link 37. As a result, the slant bases 35 and 39 are subjected to force provided by the restoring forces of the compression and tension springs 32a and 32b and acting to rotate them in a counterclockwise direction so that the guide roller 34 and the slant post 38 mounted on the slant bases 35 and 39 may guide the travel of the tape during imparting the full pressure to the tape.

When the operating mode is changed over from the above described state to an unloading state, the slant bases 35 and 39 are returned to their original positions in the reverse order to the process of the loading operation as described above. That is, the slant base 39 for the slant post is first withdrawn from the secondary guide slot portion 41b during pushing away the guide piece 43, and then the guide piece is returned to its original position under the biasing force of the spring 44 to open the main guide slot portion 41a.

Figure 7:
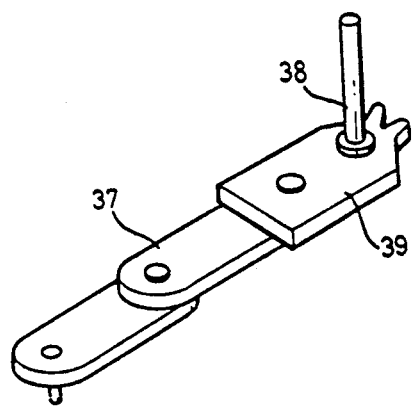
FIG. 7 is a perspective view of the slant base member including a slant post according to the present invention.

On the other hand, the multi-articulation link 37 serving to vary a position of the slant base 39 for the slant post in conformity with the configuration of the guide slot 41 during the rotation of the loading ring 30 has the construction as shown in FIG. 7, in which the number and length of the link bars may be properly changed depending upon desired design factors such as a rotational angle and positional variation of the multi-articulation link 37.

Accordingly, the present invention provides number of advantages in that since both the slant bases 35 and 39 for the guide roller 34 and the slant post are guided by and moved along the single slot comprising the guide slot portion for the guide roller 34 and the branched guide slot portion for the slant post without providing a separate guide slot for only the slant post, simplicity in construction is achieved, thereby providing compaction of the product and enhancing accuracy of operation. The enhanced accuracy of operation results in eliminating misoperation and enhancing quality of the product.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A slant post driving device for a video cassette recorder, comprising:
   loading means rotating in accordance with driving of a driving motor,
   a slide member disposed in said loading means for simultaneously transferring a pair of slant bases for a guide roller and a slant post,
   guiding means for guiding the movement of said pair of slant bases, and
   a guide piece disposed at a branched position of said guiding means for separating the travel of said pair of slant bases for said guide roller and said slant post.

2. The slant post driving device of claim 1, wherein said slide member is formed with a plurality of slots, each of slots slidably receiving a guide pin and compression and tension springs, each of said compression and tension springs being resiliently disposed between said slots and said loading means for smoothly seating a tape during tape loading operation.

3. The slant post driving device of claim 1, wherein said guiding means for guiding said slant bases includes a guide slot having an Y-shaped configuration.

4. The slant post driving device of claim 1, wherein said guide piece has a cam-shaped configuration and an engaging portion formed on one side thereof, said guide piece being pivotally disposed within a given range defined by a spring for imparting restoring force to said guide piece and a stopper rod for determining a stopped position of said guide piece for selectively opening and closing said guide slot.

* * * * *